United States Patent
Tomita et al.

(10) Patent No.: US 6,758,651 B2
(45) Date of Patent: Jul. 6, 2004

(54) GAS TURBINE

(75) Inventors: Yasuoki Tomita, Takasago (JP);
Shigehiro Shiozaki, Tokyo (JP);
Friedrich Soechting, Miami, FL (US)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 10/270,639

(22) Filed: Oct. 16, 2002

(65) Prior Publication Data

US 2004/0076511 A1 Apr. 22, 2004

(51) Int. Cl.$^7$ .............................................. F01D 9/06
(52) U.S. Cl. ................................. 415/115; 416/97 R
(58) Field of Search ....................... 415/115, 116, 415/173.1, 173.3, 191, 108, 176, 178, 213.1, 214.1; 416/97 R, 97 A, 96 R, 96 A

(56) References Cited

U.S. PATENT DOCUMENTS 2,685,429 A * 1/1954 Auyer
4,732,531 A * 3/1988 Minoda et al. ............. 415/115
5,584,651 A * 12/1996 Pietraszkiewicz et al. .. 415/115
6,139,257 A * 10/2000 Proctor et al. ............. 415/115

FOREIGN PATENT DOCUMENTS

JP         7-305603         11/1995

\* cited by examiner

*Primary Examiner*—Edward K. Look
*Assistant Examiner*—J. M. McAleenan
(74) *Attorney, Agent, or Firm*—Oblon, Spivak, McClelland, Maier & Neustadt, P.C.

(57) ABSTRACT

A gas turbine wherein cooling failure attributable to the occurrence of a horseshoe vortex produced in the vicinity of the stationary blades of the turbine is preventable, the gas turbine including moving blades provided on a rotor side which rotate together with the rotor, and stationary blades provided on a stationary side which cover the periphery of the moving blades and form a combustion gas flow path in the interior, and which are arranged alternately with the moving blades in the rotation axis direction of the rotor.

3 Claims, 4 Drawing Sheets

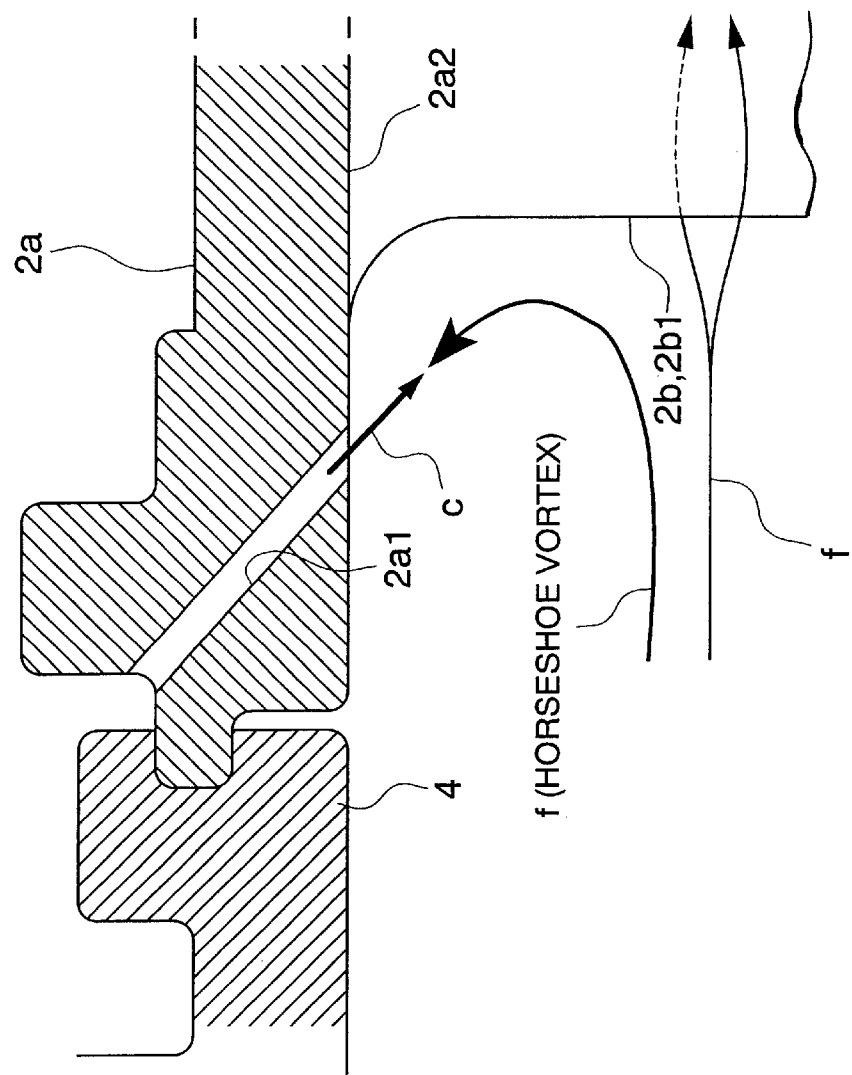

GAS TURBINE

BACKGROUND OF THE INVENTION

1. Field of the Invention

The present invention relates to gas turbines where cooling of the stationary blades inside the turbine can be effectively performed when combustion gas from the combustor is introduced into the combustion gas flow path inside the turbine.

2. Description of the Related Art

A gas turbine is constructed by providing a compressor, a combustor and a turbine (not shown in the figure). According to this gas turbine, compressed air compressed by the compressor is supplied to the combustor, and combined with separately supplied fuel and combusted. The combustion gas generated by this combustion is then supplied to the turbine, and produces a rotational driving force on the turbine.

FIG. 4 shows an example of the inner structure of the turbine. As shown in this figure, inside the turbine, multiple moving blades 1 annularly arranged on the rotor side (not shown in the figure), and multiple stationary blades 2 provided on the stationary side around the rotor periphery, are arranged alternately in the rotation axis direction of the rotor (left to right in the figure), and a combustion gas flow path 3 is formed passing through these. Accordingly, combustion gas which has been introduced into the combustion gas flow path 3 from the combustor turns the moving blades 1, applying a rotation force to the rotor. This rotation force turns a generator (not shown in the figure) connected to the rotor, to thus generate electricity.

The moving blades 1 and the stationary blades 2 are arranged alternately in:the rotation axis direction to form a multi-stage structure. Incidentally, FIG. 4 only illustrates the part up to the first and second stages, counting from upstream where the combustion gas flows in, but in reality the multi-stage structure continues further to the third stage, fourth stage and so on. Also, reference symbol 4 shown in this figure denotes a tail pipe of the combustor, which is connected to the upstream portion of the first stage.

In this turbine, in order to cool the components of the second stage blades and the like, which are heated due to introducing the combustion gas to the inside, the components of the second stage blades and the like must be cooled, and for example a structure is generally adopted which bleeds and extracts part of the compressed air compressed by the compressor and uses this for cooling the parts of moving blade 1 and stationary blade 2 and the like.

As an example of this type of cooling structure, a cooling structure for the outside shroud $2a$ of the stationary blades 2 is shown in FIG. 5. This figure is an enlarged crosssection of the part corresponding to part A of FIG. 4.

As shown in this figure, in the outside shroud $2a$, a plurality of cooling air flow paths $2a1$ is piercingly provided around the peripheral direction along the upstream edge thereof, enabling film cooling where the inner surface $2a2$ of outside shroud $2a$ is covered by cooling air c.

All of the cooling air flow paths $2a1$ are arranged so as to flow the cooling air c from upstream to downstream (that is, from left to right in the figure) matching the flow direction of the combustion gas. In this manner, the cooling air c which is discharged from the upstream side edge, covers the inner surface $2a2$, and hence the heat from the combustion gas f towards the outside shroud $2a$ is decreased.

However, in the conventional gas turbine described above, there is a problem in that, at the upstream portion of inner surface $2a2$ corresponding to the stationary blades 2, film cooling cannot be effectively demonstrated, so that the wall temperature of the outside shroud 2 is locally increased.

That is to say, the combustion gas f which has reached the leading edge $2b1$ of the blade porition $2b$ of the stationary blade 2, separates into a flow towards the driving face side of the blade portion $2b$, and a flow flowing along the suction surface, being the reverse face side. However, at the portion near the outside shroud $2a$, as shown in FIG. 5, a U-shaped reverse flow is produced (since the shape of this flow resembles a horseshoe, this is called a horseshoe vortex). This horseshoe vortex is produced in the opposite direction to the flow of cooling air c discharged from the cooling air flow path $2a1$, and thus disturbs and obstructs the flow of cooling air c, reducing the cooling function. Therefore, the wall temperature of the outside shroud 2 is locally raised compared to at other places.

This increase in wall temperature attributable to the horseshoe vortex is not limited to the outside shroud $2a$, and there is the likelihood of a similar occurrence also at the inside shroud $2c$ shown in FIG. 4.

SUMMARY OF THE INVENTION

The present invention takes the above situation into consideration, with the object of providing a gas turbine where cooling failure attributable to the occurrence of a horseshoe vortex produced in the vicinity of the stationary blades of the turbine, can be prevented.

The present invention adopts the following means for solving the above problem.

That is to say, the present invention provides a gas turbine comprising moving blades provided on a rotor side which rotate together with the rotor, and stationary blades provided on a stationary side which cover the periphery of the moving blades and form a combustion gas flow path in the interior, and which are arranged alternately with the moving blades in the rotation axis direction of the rotor, and where the stationary blades have a blade portion arranged inside the combustion gas flow path, an outside shroud provided on an outer peripheral end side of the blade portion, and an inside shroud provided on an inner peripheral end side of the blade portion, wherein in one or both of the outside shroud and the inside shroud, corresponding to a leading edge of the blade portion, there is provided a first cooling air flow path which blows out cooling air into the combustion gas flow path, from downstream to upstream in the flow direction of the combustion gas.

According to the gas turbine, the horseshoe vortex which is generated corresponding to the leading edge of the blade portion, flows in the opposite direction to the direction of flow of the combustion gas, but because cooling air which is discharged from the first cooling air flow path also flows from downstream to upstream in the flow direction of the combustion gas, there is no direct confrontation of the flow direction of the cooling air with the horseshoe vortex as in conventional method. As a result, the supply of cooling air to the combustion gas flow path is easier than for the conventional method.

In the gas turbine, it is preferable that in one or both of the outside shroud and the inside shroud, there is provided a second cooling air flow path which blows out cooling air into the combustion gas flow path, at a position between a connection point with the leading edge and the first cooling air flow path.

According to the gas turbine, by means of the cooling air discharged from the second cooling air flow path, the portion between the connection point with the leading edge, and the first cooling air path can be cooled by convection cooling.

In the gas turbines, it is preferable that the first cooling air flow path is provided in the outside shroud of a first stage stationary blade, being the stationary blade arranged in the most upstream position in the flow direction of the combustion gas.

According to the gas turbine, since cooling failures attributable to the occurrence of a horseshoe vortex, is particularly likely to be a problem at the outside shroud of the first stage stationary blades, by applying the present invention to this portion, the effect of the present invention can be particularly effectively demonstrated.

BRIEF DESCRIPTION OF THE DRAWINGS

FIG. 5 is a view showing part of a conventional stationary blade provided in the turbine, being an enlarged cross-section of a part corresponding to part A of FIG. 4.

DESCRIPTION OF THE PREFERRED EMBODIMENT

Figure 1:
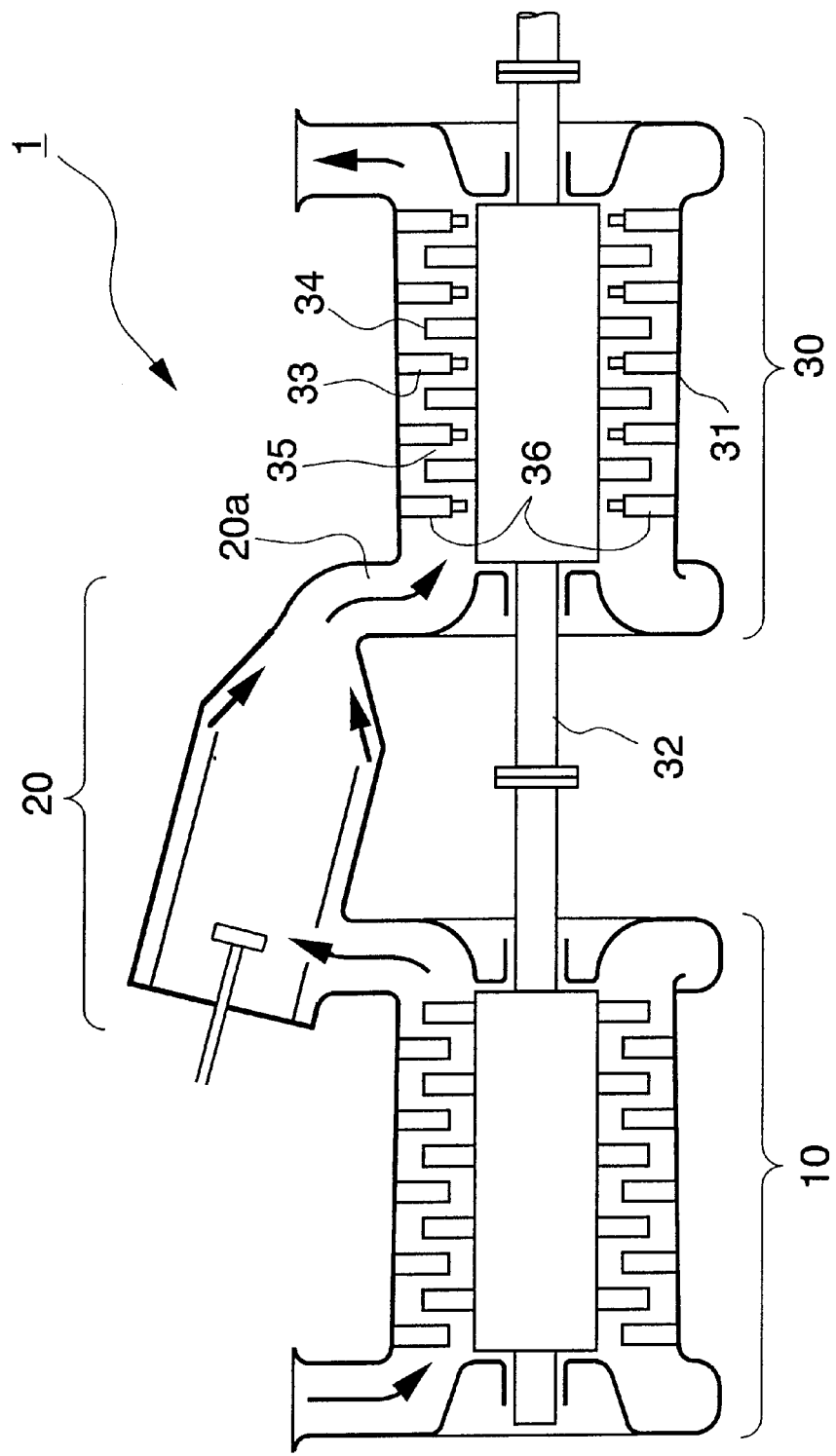
FIG. 1 is a view showing an embodiment of a gas turbine of the present invention, being an explanatory diagram for explaining the general structure.
Figure 2:
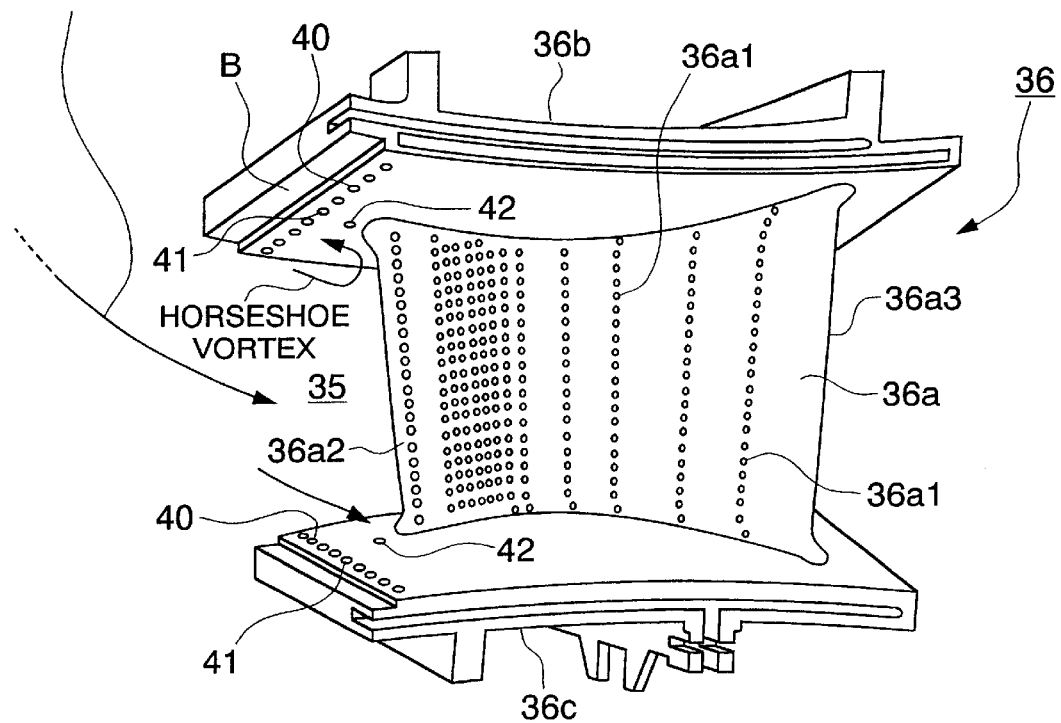
FIG. 2 is a view showing a stationary blade provided in the turbine of the gas turbine shown in FIG. 1, being a perspective view from the driving face side.
Figure 3:
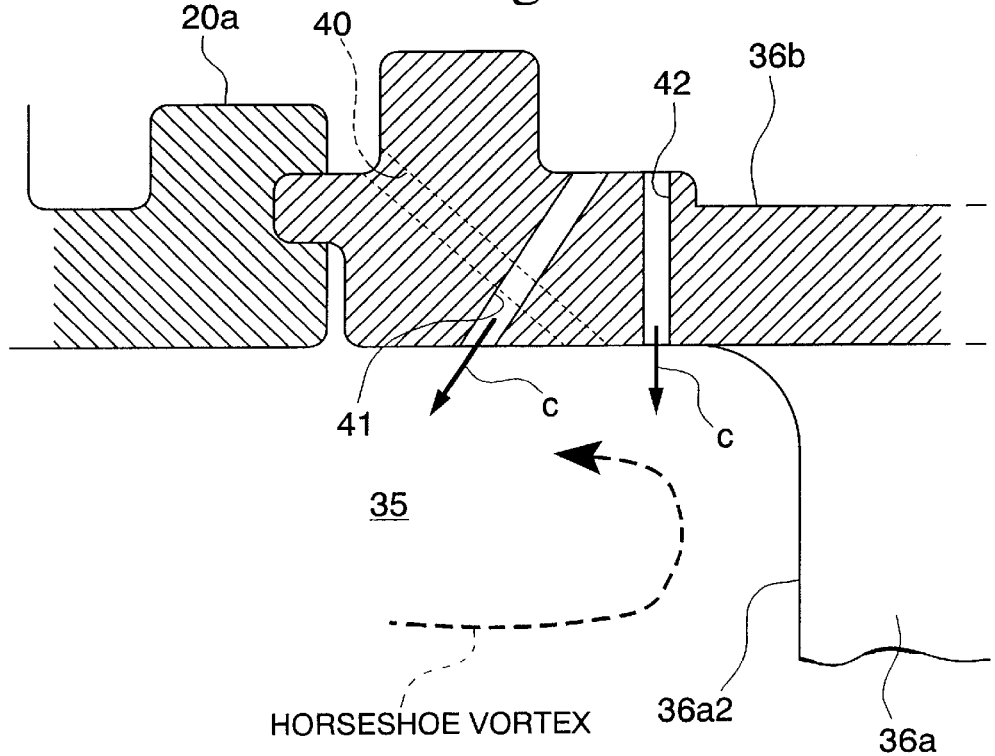
FIG. 3 is a view showing the main parts of the stationary blade, being a longitudinal section of part B of FIG. 2.
Figure 4:
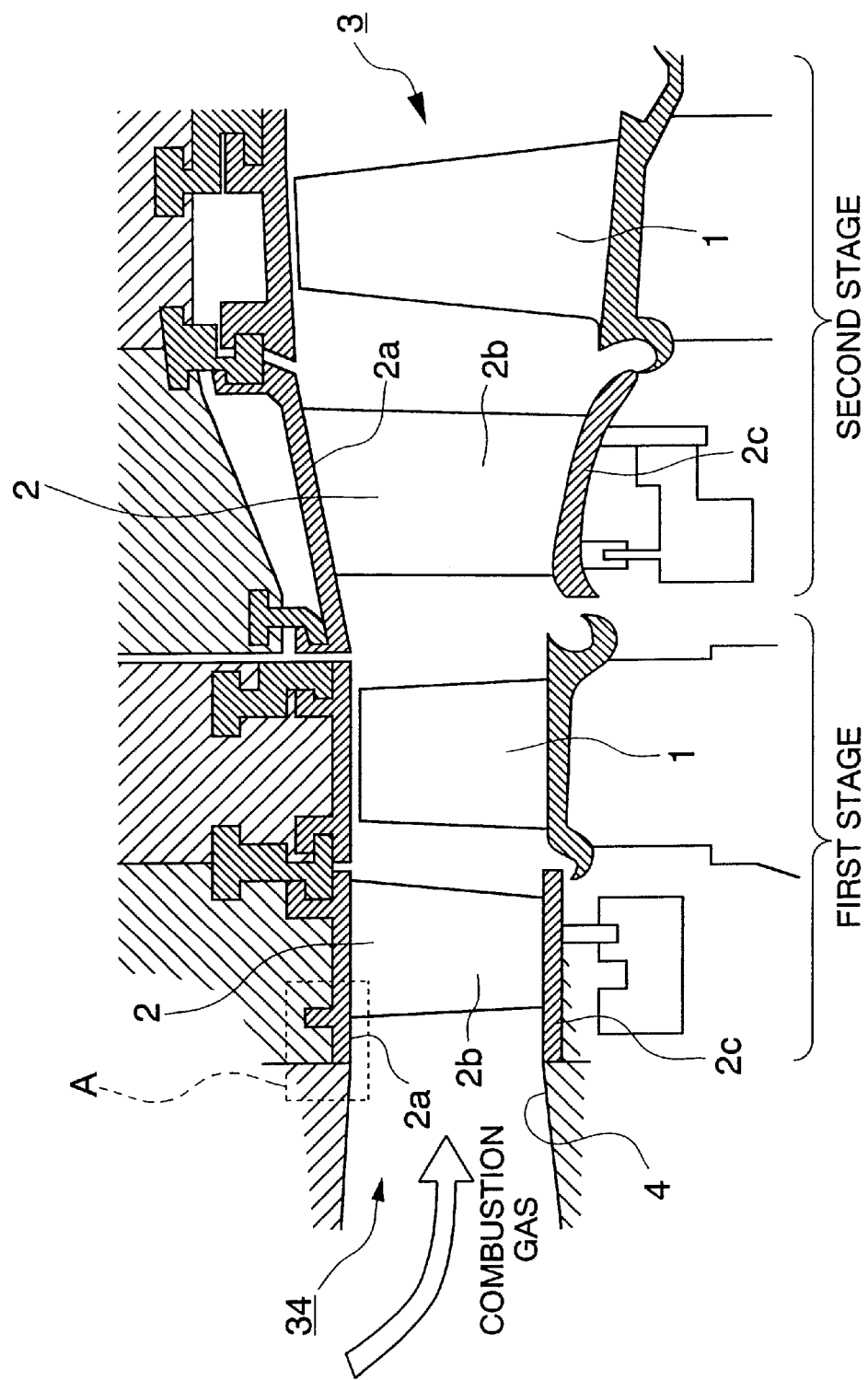
FIG. 4 is a view showing the inner structure of the neighboring parts of the combustion gas flow path in the turbine of the gas turbine, being a partial cross-section view on a cross-section including the rotor shaft.

Below, an embodiment of a gas turbine of the invention will be described hereunder with reference to the drawings. However needless to say the present invention is not to be interpreted as limited to this. FIG. 1 is an explanatory diagram for explaining an outline configuration of the gas turbine of the present embodiment. Moreover, FIG. 2 is a view showing a stationary blade provided in the turbine of the gas turbine, being a perspective view from the driving face side. Furthermore, FIG. 3 is a view showing the main parts of this stationary blade, being a longitudinal section of part B of FIG. 2 (that is to say, FIG. 3 is a view of the part corresponding to FIG. 5).

FIG. 1 shows the outline configuration of the gas turbine of the present embodiment. In this figure, reference symbol 10 denotes the compressor, reference symbol 20 denotes the combustor, and reference symbol 30 denotes the turbine. The compressor 10 compresses by taking in large quantities of air into the interior thereof Normally in the gas turbine, part of the power which is obtained from turbine 30 is used to power the compressor 10. The combustor 20 combusts by combining fuel with compressed air which has been compressed by the compressor 10. The turbine 30 expands the combustion gas generated in the combustor 20 by introducing this into the interior thereof and flowing this between moving blades 34 provided on a rotor 32 side, and coverts the thermal energy of the combustion gas into mechanical rotational energy to generate power.

The turbine 30, besides the multiple moving blades 34 provided on the rotor 32 side, comprises multiple stationary blades 33 provided on a casing 31 side (stationary side). These moving blades 34 and stationary blades 33 are arranged alternately in the rotation axis direction of the rotor 32. The moving blades 34 rotate the rotor 32 due to the flow of combustion gases flowing in the rotation axis direction of rotor 32, and the rotational energy imparted to the rotor 32 is taken out from the shaft end and used. That is to say, power can be generated by connecting a generator (not shown in the figure) to the rotor 33.

The casing 31 covers the periphery of the moving blades 33 and the rotor 32, forming a combustion gas flow path 35 in the interior.

A plurality of combustors 20 is arranged annularly around the circumferential direction centered on the rotation axis of the rotor 32, so that combustion gas discharged from tail pipes 20a is introduced obliquely to the combustion gas flow path 35 of the turbine 30. Consequently, as shown in FIG. 1 and FIG. 2, the combustion gas introduced from the combustor 20, at first enters to the first stage stationary blades 36 arranged in the most upstream position in the flow direction of the combustion gas, in an oblique direction from the radial outside towards the inside centered on the rotation axis.

In the gas turbine of this embodiment, the cooling structure of the first stage stationary blades 36 in the turbine 30 is particularly characteristic. Therefore, the following explanation will focus on the characteristic points.

As shown in FIG. 2, the first stage stationary blades 36 have a general structure comprising; a blade portion 36a arranged within the combustion gas flow path 35, an outside shroud 36b integrally provided on the outer peripheral end side of the blade portion 36a, and an inside shroud 36c integrally on the inner peripheral end side of blade portion 36a.

The blade portion 36a, as an airfoil, forms a rotational flow which rotates the introduced combustion gas in the direction of rotation of the rotor 32. On the front face of blade portion 36a, a plurality of cooling air outlets 36a1 for the purpose of film cooling are piercingly provided. Here, reference symbol 36a2 in FIG. 2 denotes the leading edge and reference symbol 36a3 denotes the trailing edge.

The outside shroud 36b is connected between the mutually adjacent first stage stationary blades 36 so as to give an annular shape. Similarly, the inside shroud 36c is also connected between the mutually adjacent first stage stationary blades 36 so as to give an annular shape. Moreover, the combustion gas flow path 35 is formed between the inner surface of the outside shroud 36b and the outer surface of the inside shroud 36c.

The points in the above description are not limited to the first stage stationary blades 36, and the other stationary blades 33 also have substantially the same structure.

As shown in FIG. 2 and FIG. 3, at the first stage stationary blades 36 of the present embodiment, in both the outside shroud 36b and the inside shroud 36c corresponding to the leading edge 36a2 of the blade portion 36a, there is formed a first cooling air flow path 41 which blows out cooling air c into the combustion gas flow path 35, from downstream to upstream in the flow direction of the combustion gas. This first cooling air flow path 41 is formed for each place in the outside shroud 36b and the inside shroud 36c at the upstream side position of the leading edge 36a2.

In the upstream side edge of the outside shroud 36b and the inside shroud 36c, a plurality of cooling air holes 40 for film cooling is formed, in the conventional manner, at each place other than the upstream side position of leading edge 36a2. Moreover, cooling air from these cooling air holes 40 is discharged into combustion gas flow path 35, from upstream to downstream in the combustion gas flow direction, covering and cooling the inner surface of the outside shroud 36b and the outer surface of the inside shroud 36c.

Furthermore, second cooling air flow paths 42 which blow out cooling air into the combustion gas flow path 35, are formed in the outside shroud 36b and the inside shroud 36c at positions between the connection point with the leading edge 36a2 and the first cooling air flow path 41. These second cooling air flow paths 42, are formed for each place in the outside shroud 36b and the inside shroud 36c, facing in the radial direction centered on the axis of rotation.

According to the gas turbine of the present embodiment having the above described structure, at the first stage stationary blades 36 of the turbine 30, even if a horseshoe vortex is created at neighboring parts of the outside shroud 36b and the inside shroud 36c of the blade portion 36a, because the cooling air c which is discharged from the first cooling air flow path 41, also flows from downstream to upstream in the flow direction of the combustion gas, there is no direct confrontation of the flow direction of the cooling air c with the horseshoe vortex, as in the conventional method. As a result, the supply of cooling air to the combustion gas flow path 35 is easier than for the conventional method. Consequently, because the cooling air c can flow without going against the flow of the horseshoe vortex, cooling failure attributable to the creation of the horseshoe vortex can be prevented, enabling effective cooling of the portion corresponding to the upstream side position of the leading edge 36a2, for both the upstream side edges of the outside shroud 36b and the inside shroud 36c.

Additionally, among the stationary blades 33 of each stage, by selecting the first stage stationary blades 36 where particularly strong horseshoe vortexes are likely to be generated, and providing the first cooling air flow paths 41, it is possible to effectively prevent cooling failure particularly attributable to the creation of horseshoe vortexes.

Furthermore, the formation place for the first cooling air flow path 41 is not limited merely to the first stage stationary blades 36, and this may be formed for all stages of the stationary blades 33. However, providing these for the first stage stationary blades 36 is more effective.

Moreover, in the case of choosing only one of the outside shroud 36b and the inside shroud 36c for forming the first cooling air flow path 41, it is preferable to select the outside shroud 36b. This depends on the relationship of the arrangement of the combustor 20 with respect to the turbine 30. That is to say, as mentioned previously, the combustion gas introduced from the combustor 20 enters at an oblique direction to the first stage stationary blades 36. As a result, as shown in FIG. 2, for the connection point between the inside shroud 36c and the leading edge 36a2, because the combustion gas flows in so as to directly impinge on this, a horseshoe vortex is comparatively difficult to generate. However, for the connection point between the outside shroud 36b and the leading edge 36a2, because the combustion gas does not directly impinge on this, it is easy to generate a strong horseshoe vortex. Due to these reasons, it is preferable to select the outside shroud 36b as the formation location for the first cooling air flow paths 41.

Also, in the present embodiment, by further providing the second cooling air flow path 42, the portion between the connection location between the leading edge 36a2 and the outside shroud 36b and the inside shroud 36c, and the first cooling air paths 41 can be effectively cooled by convection cooling.

Furthermore, the formation location for the second cooling air flow path 42 is not limited to both the outside shroud 36b and the inside shroud 36c, and may be provided only on outside shroud 36b. Moreover, the second cooling air flow path 42 may be formed not only for the first stage stationary blades 36, but may also be provided for the other stationary blades 33, matching the formation location of the first cooling air flow, path 41.

What is claimed is:

1. A gas turbine comprising moving blades provided on a rotor side which rotate together with said rotor, and stationary blades provided on a stationary side which cover the periphery of said moving blades and form a combustion gas flow path in an interior portion of the turbine, and which are arranged alternately with said moving blades in a rotational axis direction of said rotor and wherein said stationary blades have a blade portion arranged inside said combustion gas flow path, an outside shroud provided on an outer peripheral end side of said blade portion, and an inside shroud provided on an inner peripheral end side of said blade portion, wherein at least in one of said outside shroud and said inside shroud, corresponding to a leading edge of said blade portion, there is provided a first cooling air flow path which blows out cooling air into said combustion gas flow path, from downstream to upstream in a flow direction of said combustion gas and wherein in said at least one of said outside shroud and said inside shroud, there is provided a second cooling air flow path which blows out cooling air into said combustion gas flow path, at a position between a connection point with said leading edge and said first cooling air flow path, said second cooling flow air path facing in a radial direction centered on a rotational axis of the moving blades.

2. A gas turbine according to claim 1, wherein said first cooling air flow path is provided in the outside shroud of a first stage stationary blade, arranged in a most upstream position in the flow direction of said combustion gas.

3. A gas turbine comprising moving blades provided on a rotor side which rotate together with said rotor, and stationary blades provided on a stationary side which cover the periphery of said moving blades and form a combustion gas flow path in an interior portion of the turbine, and which are arranged alternately with said moving blades in a rotational axis direction of said rotor and wherein said stationary blades have a blade portion arranged inside said combustion gas flow path, an outside shroud provided on an outer peripheral end side of said blade portion, and an inside shroud provided on an inner peripheral end side of said blade portion, wherein at least in one of said outside shroud and said inside shroud, corresponding to a leading edge of said blade portion, there is provided a first cooling air flow path which blows out cooling air into said combustion gas flow path, from downstream to upstream in a flow direction of said combustion gas.

* * * * *